(12) United States Patent
Simpson

(10) Patent No.: US 11,613,893 B1
(45) Date of Patent: Mar. 28, 2023

(54) BIRD DETERRENT SYSTEM

(71) Applicant: Steven M. Simpson, Andersonville, TN (US)

(72) Inventor: Steven M. Simpson, Andersonville, TN (US)

( * ) Notice: Subject to any disclaimer, the term of this patent is extended or adjusted under 35 U.S.C. 154(b) by 0 days.

(21) Appl. No.: 17/408,860

(22) Filed: Aug. 23, 2021

(51) Int. Cl.
*E04D 12/00* (2006.01)
*A01M 29/30* (2011.01)

(52) U.S. Cl.
CPC ............ *E04D 12/002* (2013.01); *A01M 29/30* (2013.01)

(58) Field of Classification Search
CPC ...... E04D 12/002; A01M 29/30; A01M 29/00
See application file for complete search history.

(56) References Cited

U.S. PATENT DOCUMENTS

| | | | |
|---|---|---|---|
| 5,406,754 A * | 4/1995 | Cosby | E04D 13/076 52/12 |
| 6,094,883 A * | 8/2000 | Atkins | E04G 21/3223 52/407.3 |
| 8,635,811 B2 * | 1/2014 | Horton | E04D 13/076 52/12 |
| 9,127,463 B1 * | 9/2015 | Feldhaus | E04D 13/076 |
| 9,163,406 B1 * | 10/2015 | Ealer, Sr. | E04D 13/00 |
| 10,480,193 B2 * | 11/2019 | Brochu | B21D 28/26 |
| 2002/0117313 A1 * | 8/2002 | Spencer | A01M 29/32 174/5 R |
| 2004/0194423 A1 * | 10/2004 | Payne | A01M 29/32 52/741.1 |
| 2006/0207195 A1 * | 9/2006 | Donoho | A01M 29/32 52/101 |
| 2011/0209419 A1 * | 9/2011 | Lippie | A01M 29/32 52/101 |
| 2012/0151849 A1 * | 6/2012 | Brochu | E04D 13/076 52/12 |
| 2017/0204611 A1 * | 7/2017 | Brochu | E04D 13/064 |

* cited by examiner

*Primary Examiner* — Gisele D Ford
(74) *Attorney, Agent, or Firm* — Luedeka Neely Group, PC

(57) ABSTRACT

A pest deterrent system is provided by an elongate flat flexible panel configured to be formed into a compressed bowed shape and installed in the compressed bowed shape onto a portion of a roof support and an underside of roof sheathing. The bowed shape of the installed panel frictionally secures the panel in place adjacent the roof support and the roof sheathing without the use of fasteners.

1 Claim, 3 Drawing Sheets

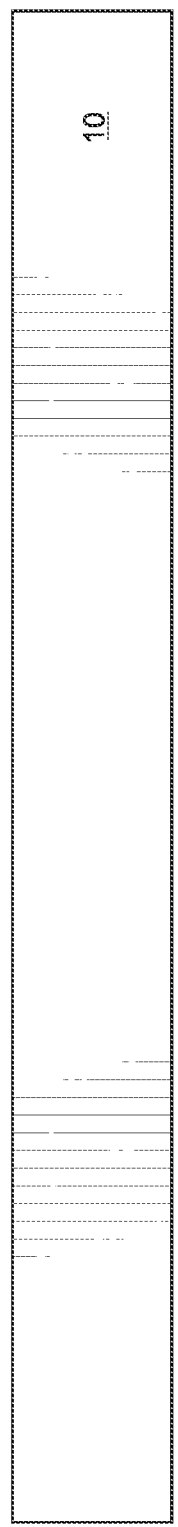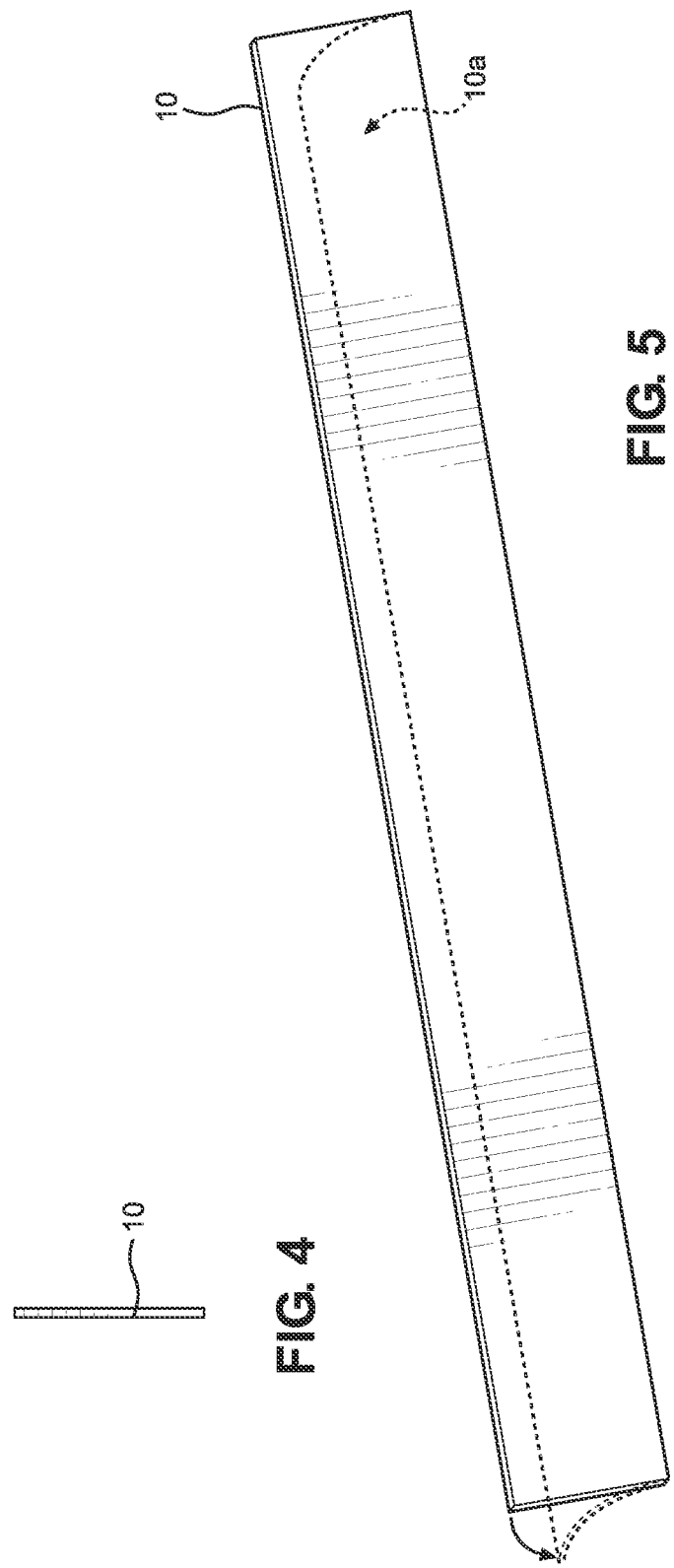

BIRD DETERRENT SYSTEM

FIELD

This disclosure relates to the field of bird and pest deterrent devices. More particularly, this disclosure relates to a bird and pest deterrent system that is installable without the use of tools and fasteners.

BACKGROUND

Birds tend to roost, build nests, and the like on roof purlins, especially of roofs at marinas and the like. This leads to droppings and other messes on boats and walkways below.

What is desired is a shield or deterrent structure and a way to easily attach a shield or other deterrent structure to roof structures to inhibit birds and other animals from being on the roof structure.

SUMMARY

The above and other needs are met by a bird and pest deterrent systems according to the disclosure In one aspect, a system according to the disclosure includes an elongate roof support; an elongate roof sheathing supported by the elongate roof support; and an elongate flat flexible panel inserted in a compressed bowed shape onto a portion of the roof support and an underside of the roof sheathing. The bowed shape of the panel frictionally secures the panel in place adjacent the roof support and the roof sheathing without the use of fasteners.

In another aspect, a system according to the disclosure includes an elongate flat flexible panel configured to be formed into a compressed bowed shape and installed in the compressed bowed shape onto a portion of a roof support and an underside of roof sheathing, wherein the bowed shape of the installed panel frictionally secures the panel in place adjacent the roof support and the roof sheathing without the use of fasteners.

In a further aspect, a method according to the disclosure for deterring pests from a roof structure having a roof purlin supporting roof sheathing, includes the steps of providing an elongate flat flexible panel; conforming the panel to a compressed outwardly bowed shape; and frictionally installing the panel in the compressed outwardly bowed shape onto a portion of the roof support and an underside of the roof sheathing without the use of fasteners so that the outwardly bowed shape maintains the panel in place and is located to inhibit pests from access to the purlin and the underside of the roof sheathing.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIG. 3 is a side view of the bird deterrent device.

FIG. 4 is an end view of the bird deterrent device.

FIG. 5 is a perspective view of the bird deterrent device showing how it is bowed or flexed for installation onto a roof purlin.

DETAILED DESCRIPTION

Figure 1:
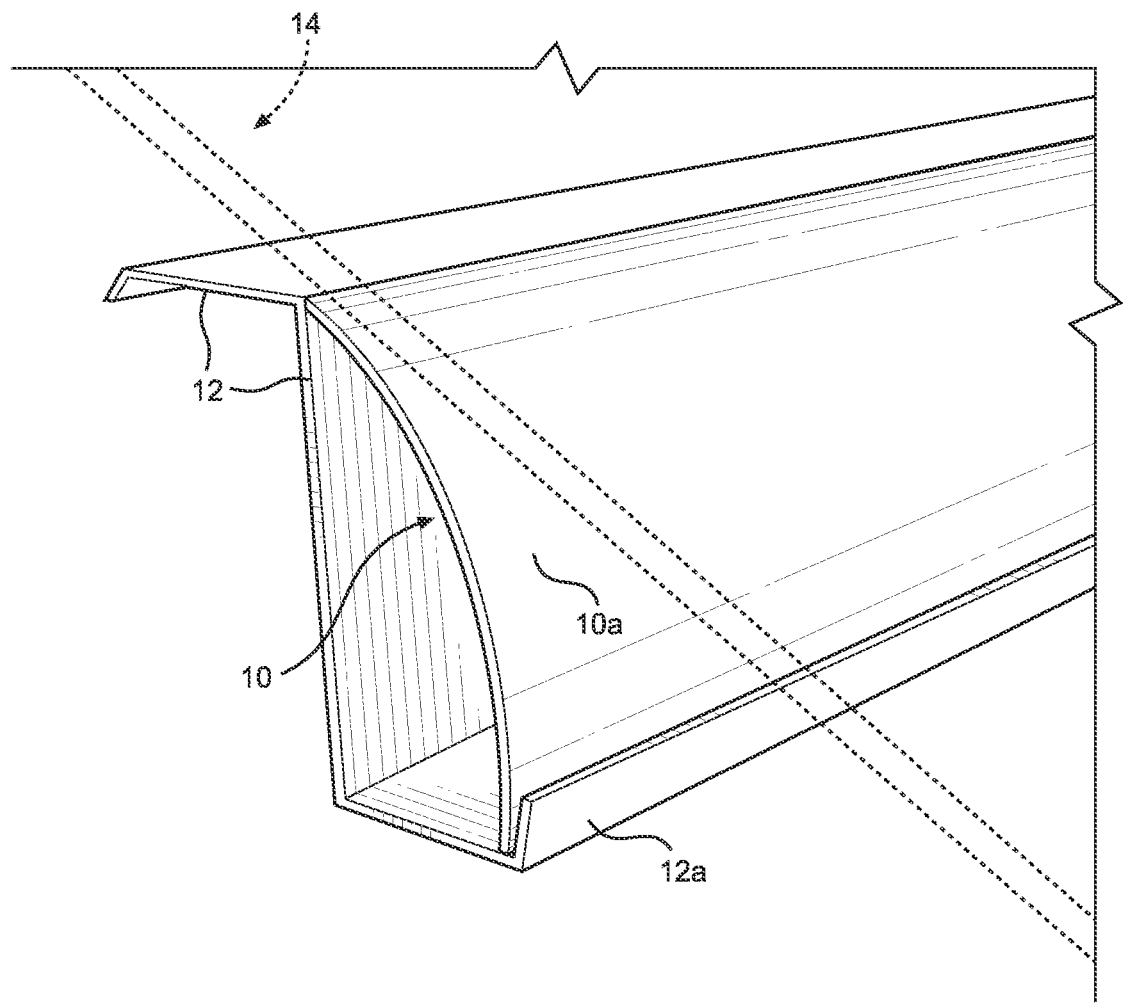
FIG. 1 is a perspective view of a bird deterrent device according to the disclosure installed onto a roof purlin below a roof.
Figure 2:
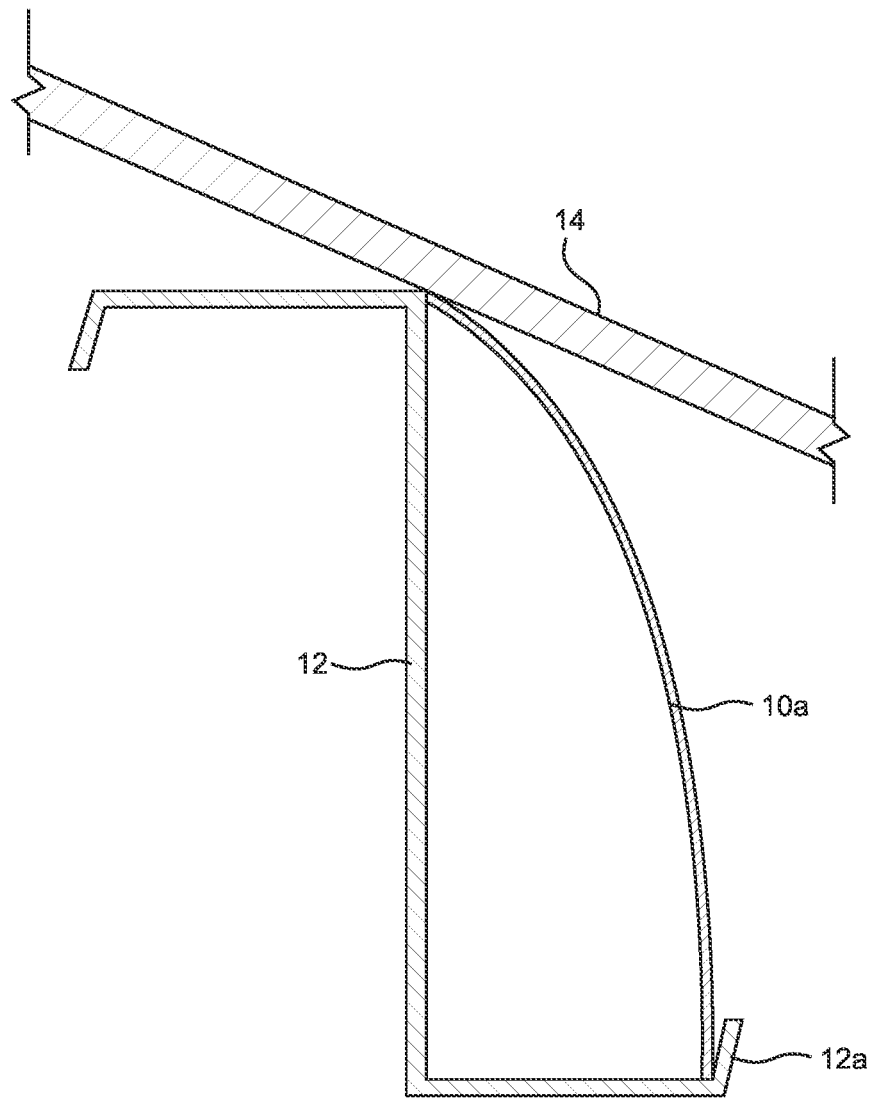
FIG. 2 is a cross-sectional end view of FIG. 1.

With reference to the drawings, there is shown a bird deterrent device 10 according to the disclosure. The bird deterrent device 10 is configured as a one-piece flexible panel that is inserted onto or into a roof purlin 12 having a lip 12a located below and supporting roof sheathing 14 to provide a bird deterrent system. While described in connection with bird deterrence, it will be appreciated that this includes deterrence of other pest animals, such as squirrels, mice, bats, and the like.

The bird deterrent device 10 has a flat native shape, and is desirably inserted in a compressed bowed or curved shape into the lip 12a of the roof purlin 12 and the underside of the roof sheathing 14 adjacent an upper portion of the purlin 12. The bowed shape provides a tension at edges of the device 10 in contact with portions of the purlin 12 and roof sheathing 14 to frictionally secure the device 10 in place without the use of fasteners. Furthermore, no preparation, such as drilling or forming apertures, or fasteners, or tools are need for installation.

As installed, the device 10 presents a convex outwardly bowed surface 10a which faces outward of the purlin 12. It has been observed that the bowed surface 10a of the device 10 installed in this manner deters access of birds, squirrels, and like pests from the purlin and the underside of the roof sheathing, and deters them from landing, nesting, sitting, walking or otherwise being on the purlin 12 or adjacent parts of a roof provided by the purlin 12 and roof sheathing 14.

The device 10 may be provided by a plastic panel, such as a styrene plastic panel having a length of about 92 inches, a width of about 9 inches, and a thickness of about 0.06 inches. The device 10 may be provided in a variety of colors for aesthetically matching the roof structure. The device may also include logos or other decorative indicia or indicium. This sizing of the device is for use with conventional sized roof purlins. It will be appreciated that the device may be provided in a variety of lengths, widths, and thicknesses for use with various roof supports and sheathings.

The purlin 12 is a conventional metal Z-purlin or other rigid purlin or support used with rigid roof sheathing such as metal roof sheathing. The roof sheathing 14 is a conventional metal or similar rigid roof sheathing.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method for deterring pest from a roof structure having a roof purlin supporting roof sheathing, the method comprising the steps of: providing an elongate flat flexible panel; conforming the panel to a compressed outwardly bowed shape onto a portion of the roof purlin and an underside of the roof sheathing without the use of fasteners so that the outwardly bowed shape of the panel extends between the roof purlin and the roof sheathing and maintains the panel in place on the purlin to inhibit pests from access to the purlin and the underside of the roof sheathing.

\* \* \* \* \*